United States Patent

Garner

[15] 3,680,873
[45] Aug. 1, 1972

[54] AXIALLY AND ROTATIONALLY LOCKED BEARING SEAL

[72] Inventor: Lloyd L. Garner, Los Alamitos, Calif.

[73] Assignee: Smith International, Inc., Newport Beach, Calif.

[22] Filed: July 6, 1970

[21] Appl. No.: 52,554

[52] U.S. Cl. ............... 277/9, 277/95, 277/DIG. 10
[51] Int. Cl. ........................ F16j 9/00, F16j 15/34
[58] Field of Search .......... 277/94, 95, 237 F, 9, 9.5, 277/181, 182, DIG. 10

[56] References Cited

UNITED STATES PATENTS

| | | | |
|---|---|---|---|
| 3,489,421 | 1/1970 | Neilson | 277/95 |
| 2,886,347 | 5/1959 | Kupchick | 277/9 |
| 3,195,907 | 7/1965 | Eckenrod | 277/237 F |
| 2,626,193 | 1/1953 | Patterson | 277/237 F |

Primary Examiner—Samuel B. Rothberg
Attorney—Allan D. Mockabee

[57] ABSTRACT

A seal for use between relatively rotatable parts including an inner annular ring, preferably metallic, and an outer annular element of yieldable seal material, the inner resilient ring having a weakened break point which will remain unbroken during the bonding of the annular yieldable material to the ring, the ring being separable at the break point when forced over an abutment on one of the relatively rotatable parts, the ring and yieldable material returning approximately to their original diameters after passing the abutment, and the yieldable material being subjected to pressure deformation to tightly secure the resilient ring radially inwardly about the relatively rotatably part and axially outwardly against the abutment.

8 Claims, 6 Drawing Figures

PATENTED AUG 1 1972 3,680,873

INVENTOR.
LLOYD L. GARNER
BY
ATTORNEY

AXIALLY AND ROTATIONALLY LOCKED BEARING SEAL

PRIOR ART

The present invention is an improvement upon seals of the general type disclosed in the following patents:

U.S. Pat. No. 2,797,67—Fisher, 1957.
U.S. Pat. No. 3,075,781—Atkinson, 1963
U.S. Pat. No. 3,199,878—Cunningham, 1965
U.S. Pat. No. 3,370,895—Cason, 1968
U.S. Pat. No. 3,489,421—Neilson, 1970.

In the above patents, Cunningham describes one embodiment wherein the seal is held against rotation on a shaft due to a press fit of the seal thereon. Cason teaches a press fit and also the use of a suitable adhesive to retain the seal against rotation. Neilson teaches retention of the seal against rotation by means of staking and also by spot welding of the metallic retaining ring to the supporting shaft. These arrangements are useful to a certain extent. The seals which are interferingly fitted on the shafts will, after a certain amount of use or under certain rough environmental situations, work loose and move axially, permitting particles, such as bits of shale and well drillings, to work behind the seal and destroy it. The staked and welded securing means is quite effective but even here, under some circumstances, shale and other formation particles will work behind the seal and break it loose so that the seal is displaced axially by the additional accumulation of formation particles and the destructive shortening of the life of the seal.

DISCLOSURE

The present invention relates to a seal formed preferably of an inner resilient metallic ring and a radially outwardly extending continuous annular skirt element of yieldable material, which is held upon the cylindrical portion of a shaft or a drilling bit cutter journal under compressive force between an inwardly or rearwardly extending abutment, and an inwardly spaced outwardly or forwardly disposed backup portion or abutment, the inner resilient retaining ring having a weakened break point in its free state, after installation of the seal the compressive forces exerted on the skirt of yieldable material being such that the split ring is tightly constricted about the cylindrical portion of the shaft or journal behind the outer abutment, and the resilient ring is pressed into high frictional engagement with the inwardly facing outer abutment much in the manner of the action of a disc-type motor vehicle brake Another object of the invention is to provide a seal comprising a resilient metallic retaining ring and a yieldable skirt of seal material, the latter being bonded to the ring, and wherein the resilient ring is provided with a weakened break point to permit the annulus of the ring to be broken after the bonding of the seal material thereto, so that the ring can be forced over a portion of a shaft or journal defining an abutment behind which the ring is to be secured against axial movement.

A further object is to provide a seal of the type described wherein the weakened portion may be in the form of a gap or cut partially across the resilient ring either outward from the inner circumference or inward from the outer circumference prior to the bonding of the yieldable skirt, or the weakened break point may be cut or formed in the ring inwardly from the outer circumference after the bonding operation without injuring the continuity of the bond or the annular continuity of the yieldable skirt.

A further object is to provide a method of producing and installing a seal of the type described above.

The above and other objects and advantages of the invention will more fully appear from the following description in connection with the accompanying drawing.

Figure 1:
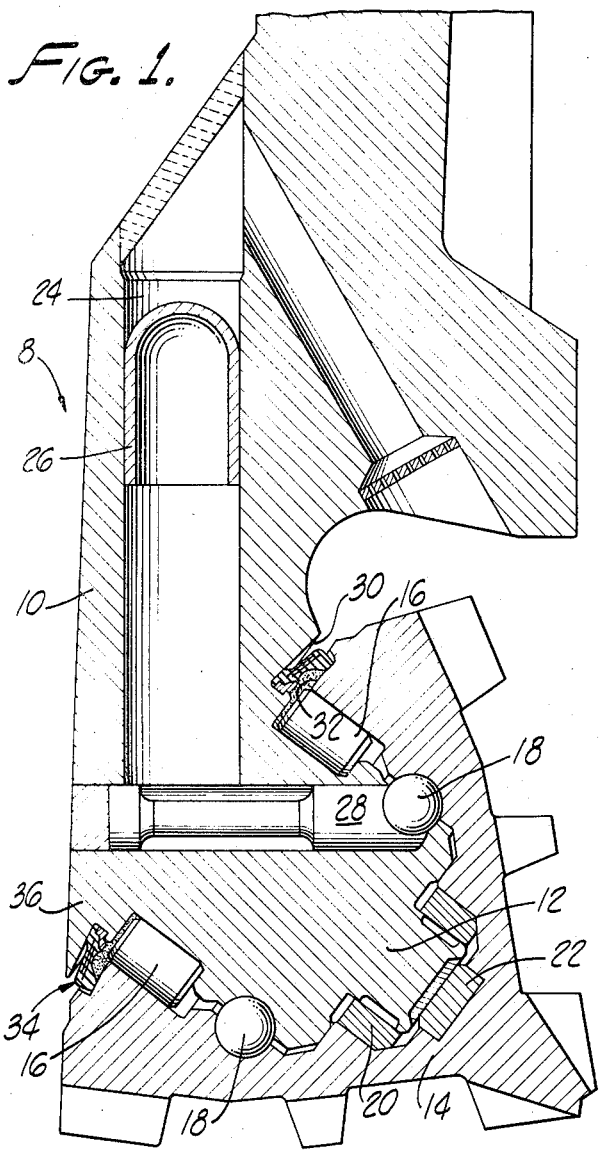
FIG. 1 is a vertical sectional view through a portion of a drill bit showing the location of my seal therein.

There is illustrated a portion of a drilling bit 8 which is provided to show a preferred environment for my seal. It includes a body 10 having a downwardly and outwardly projecting journal 12 upon which is rotatably mounted a cone cutter 14 rotatably supported by bearing rollers 16, balls 18, a sleeve 20 and having a thrust bearing 22 between its inner end and the outer end of the journal 12. Customarily, the bit body 10 is provided with a chamber 24 to receive a lubricant cartridge 26 of flexible material and which is subject to down hole drilling mud pressures so that lubricant is fed from the cartridge 26 and around a plug 28 to the interior of the rotary cone cutter 14 and its several bearings. Between a face 30 of the drill body 10 and an opposed face 32 of the cone cutter 14 is a seal 34. This seal is provided to retain the lubricant and also to prevent the entry of cuttings from the formation into the interior of the cone cutter 14 and its various bearings. The seal 34 is shown with a major portion thereof spaced from the surface 30 so that drilling mud under pressure will urge the seal toward the cutting surface 32 and provide an effective sliding seal.

Figure 4:
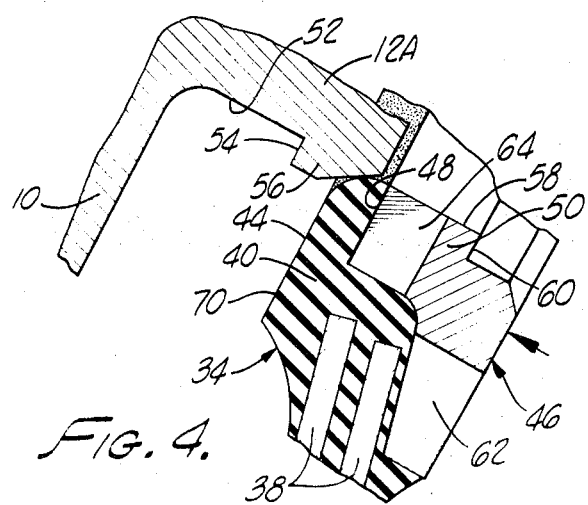
FIG. 4 is an enlarged sectional detail showing the seal in position to be forced upon its journal.
Figure 2:
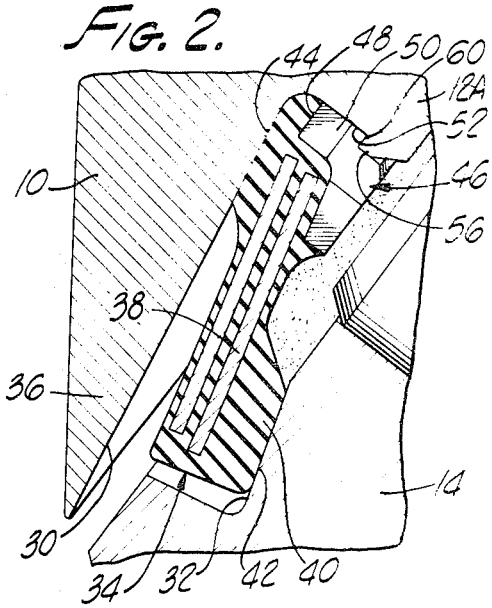
FIG. 2 is an enlarged fragmentary sectional detail of a portion of the bit body and cutter with the seal in one position.
Figure 3:
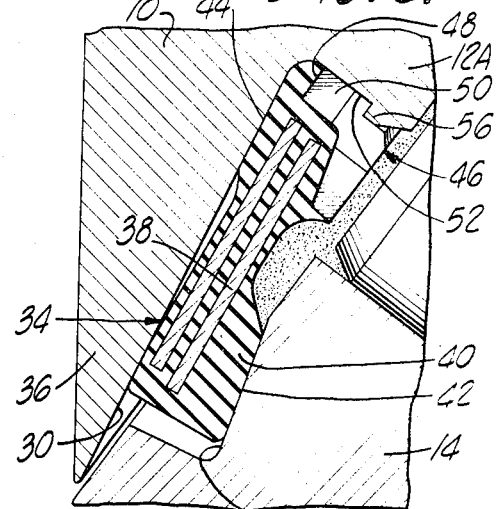
FIG. 3 is a view similar to FIG. 2 with the seal in a more flattened condition.

FIGS. 2 and 3 are of portions of the drill and cutter which appear in the lower left part of FIG. 1 and include a shirttail portion 36 which will orient the structures of FIGS. 2 and 3 with that of FIG. 1. In FIGS. 2 and 3 the seal 34 includes a pair of relatively flat frustoconical annular springs 38 which might be termed Belleville springs, said springs being enclosed in a body 40 of seal material, preferably an abrasion and oil resistant type of synthetic rubber. The rubber body 40 is provided with a seal pad 42 which wipes against the surface 32 of the cone cutter and on the opposite side at the opposite edge portion is a pad 44 which seals against the surface 30 of the drill body 10. A portion of the inner periphery of the rubber seal body 40 is bonded to a retaining ring 46, preferably of a resilient metal, which as shown in FIGS. 2, 3 and 4, is more or less L-shaped in cross section. The inner angle of the L-shaped retainer ring and the ends of its legs have the rubber body 40 bonded thereto. It is of particular importance that the rubber body 40 extend from the end 48 of the leg 50 to provide a yielding rubber cushion between said leg end 48 and the surface 30 of the drill body.

The axially inner portion 12A of the journal 12 is provided with a cylindrical portion 52 which lies between the generally radial surface 30 which faces axially outwardly and an axially inwardly facing surface 54 of a shoulder 56 formed on the journal portion 12A. The inner diameter 58 of the resilient retaining ring 46 is slightly less than the diameter of the cylindrical journal portion 52, so that the retaining ring 46 cannot be slipped over the shoulder 56. However, the retaining ring and the bonded rubber seal skirt 40 which lies radially outwardly therefrom, must be positioned securely about the cylindrical portion 52 of the journal portion 12A, the pad 44 should make a tight slip seal with the surface 30, and the shoulder surface 60 of the retaining ring should have the tight frictional engagement with the face 54 of the shoulder 56 which defines the axially outer limit of the cylindrical journal portion 52.

In order to provide a resilient metallic retaining ring which would tightly engage the cylindrical journal portion 52, a split retaining ring was tried but it was found difficult, if not impossible, from a practical production standpoint, to mold and bond the rubber skirt 40 to the split ring because the adjacent ends of the rings at the split would not remain in proper alignment. Therefore, in order to maintain this alignment, the rubber was bonded to the ring and the ring was provided with a weakened portion constituting a break point, so that when the completed seal was forced over the abutment 56 on the journal 12, the retaining ring would break at the weakened point, permitting it to expand radially sufficiently for the ring and the rubber skirt 40 to slip over the abutment and tightly abut the cylindrical portion 52 of the journal portion 12A.

Figures 5, 6:
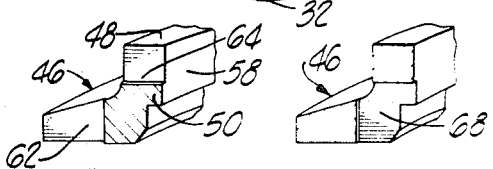
FIG. 5 is a fragmentary perspective view of a portion of a retaining ring with a break joint.
FIG. 6 is a view similar to FIG. 5 with another type of break joint.

One type of weakened portion is shown in FIG. 5 where cuts or gaps 62 and 64 are provided in the legs of the resilient ring 46 leaving a connecting portion 66 which is strong enough to maintain the resilient ring in annular continuity during the molding and bonding operation. However, when the seal is forced over the abutment 56 by inward axial pressure thereon, the connecting portion 66 will part permitting the ring to expand.

In FIG. 6 the ring 46 is shown with a cut or gap 68 formed inwardly from the corner defined by the legs of the angular ring 46. The cuts 62 and 64 in FIG. 5 can be formed in the ring prior to molding the rubber and bonding it to the ring. The cut-away portion 68 in FIG. 6 can be utilized where the ring and rubber are first bonded together and the cut 68 made after the bonding operation.

It should be noted that the overall thickness of the seal from the face 70 of the rubber pad 44 to the shoulder surface 60 on the retaining ring 46 is greater than the distance between the radial surface 30 on the drill body and the radial abutment surface 54 on the journal portion 12A. Consequently, when the seal is pressed on the journal past the abutment 56, inward axial pressure must be exerted with sufficient force to deform at least a portion of the rubber pad 44 so that the retaining ring 46 can be positioned in back of the abutment 56. The ring 46 will lodge in back of the abutment 56 and tightly around the cylindrical portion 52 of the journal portion 12A due to its inherent resilience and the resistance of the rubber pad 44 to deformation will tightly press the radial leg of the ring 46 against the radial abutment surface 54. At the same time, the deformed rubber of the pad 44 will exert a radially inward pressure against the leg 50 of the ring 46 to supplement the gripping action of the resilient ring. The inward radial forces exerted by the ring against the cylindrical surface 52 of the journal portion 12A are considerable. Tests have shown that the journal is gripped so tightly through the constrictive action of the retaining ring and the somewhat deformed rubber, as well as the axial confinement between radial surfaces 30 and 54, that the resistance of the seal unit to applied torque is considerably greater than the torque required to break spot welded connections between a retaining ring and the journal on the drill body, as disclosed in Neilson U.S. Pat. No. 3,489,421, identified above.

In addition to the fact that the seal is so tightly engaged on the journal that it cannot rotate under drilling conditions, its anchoring behind the shoulder 54 on the journal portion 12A prevents it from moving axially on the journal. In the case of press-fitted seals, and those secured by spot welds, particles of the formation being drilled, which are under pressure from the drilling mud, build up between the rubber pad 44 and the radial face 30 on the drill body and move the seal axially outwardly relative to the journal so that the seal is displaced and as a result thereof, is more rapidly worn and destroyed. Destruction of the seal terminates the life of the drill. However, with the present construction, the retaining ring being held behind the abutment 56, and the pad 44 being under considerable pressure between the retaining ring and the radial surface 30, cuttings do not get behind the pad 44 and build up axial seal displacing pressures.

In one embodiment of the invention, the retaining ring had a interference of 0.005 inch relative to the diameter of the abutment 56. The distance between the pad surface 70 and the retaining ring shoulder surface 60 was such that a load of 10,000 lbs. was required to compress the seal into the axial space between the radial faces 30 and 54 on the drill body and its journal. The seal easily held a liquid pressure of 120 P.S.I. when assembled. Then torque was applied and 230 ft. lb. of torque were required to rotate the seal with no visible damage. A torque of 220 ft. lb. on the welded type mentioned above, broke all welds and broke the retaining ring away from the remainder of the seal.

It will of course be understood that various changes may be made in the form, details, arrangement and proportions of the various parts and in the steps of the method of preparing the seal, without departing from the spirit of the invention.

I claim:

1. In a rock bit assembly, an axially and rotationally locked rock bit seal assembly including relatively rotatable parts on an axis of rotation wherein said parts have opposed faces and one part has a cylindrical wall portion about said axis of rotation and having an inner and an outer end, wherein the improvement comprises: the cylindrical portion having an outer free end, and an abutment on the outer end of said cylindrical portion defining a diameter and facing inwardly from said free end, said one part having an enlargement at the inner end of the cylindrical portion, an axially and rotationally secured seal element for use between said opposed faces comprising a continuous resilient annular retaining ring having at least one weakened portion, a continuous annular element of resilient seal material bonded to said retaining ring and extending outwardly therefrom, said retaining ring, in its free state condition, being of a diameter less than that defined by said abutment and being positioned by deformation inwardly of said abutment relative to the free end of said cylindrical portion, such that said retaining ring will press said resilient seal material in gripping contact with said cylindrical portion and in sealing engagement between said opposed faces.

2. The structure in claim 1, and means confining said continuous annular element of resilient seal material between said confining means and said abutment, and said annular retaining ring being in contact with said abutment under a load imposed by said confining means.

3. The structure in claim 1, and said cylindrical portion of said one relatively rotatable part being located inwardly from said inwardly facing abutment and being defined by said abutment and an outwardly facing abutment spaced rearwardly from said inwardly facing abutment, said element of resilient seal material having a portion lying inwardly behind said annular retaining ring and being under axial compression with said annular retaining ring disposed between said abutments, said annular retaining ring being in pressure contact with said rearwardly facing abutment.

4. In a rock bit, an axially rotationally locked rock bit seal assembly including relatively rotatable parts on an axis of rotation, said parts having opposed faces and one part having a cylindrical wall portion about said axis of rotation, the cylindrical portion having an outer free end and an abutment on the outer end thereof defining a diameter and facing inwardly from said free end, wherein the improvement comprises: a seal element comprising a resilient retaining ring and a connected radially outwardly extending continuous annular element of yieldable seal material, a portion of the resilient retaining ring being weakened to provide a break point to permit said resilient retaining ring to be ruptured at said break point when the ring is forced over said abutment, the normal diameter of said ring being less than that of said abutment.

5. The structure in claim 4, and said annular element of yieldable seal material having axially flexible spring means of continuous annular shape embedded therein, the spring means being spaced from said resilient retaining ring by a portion of said annular element of yieldable seal material.

6. The structure in claim 4, and said seal material having sufficient yieldability to maintain its annular continuity without breaking under an expansive force sufficient to break said resilient ring at said weakened break point.

7. The structure in claim 4, and the weakened portion of said resilient ring comprising a gap extending partially through the ring from the inner circumference thereof.

8. The structure in claim 4, and the weakened portion of said ring comprising a gap extending partially through the ring from the outer circumference thereof.

* * * * *